United States Patent [19]

Howell

[11] 4,009,778
[45] Mar. 1, 1977

[54] DUAL COMPARTMENT PACKAGE AND METHOD FOR MAKING SAME
[75] Inventor: Duane Aaron Howell, Davenport, Iowa
[73] Assignee: The Kartridg Pak Co., Davenport, Iowa
[22] Filed: Nov. 4, 1975
[21] Appl. No.: 628,477
[52] U.S. Cl. .................................. 206/219; 53/28; 61/45 B; 229/56
[51] Int. Cl.² .................. B65D 25/08; B65D 77/06
[58] Field of Search ............ 61/45 B; 206/219, 222; 215/DIG. 8; 229/56; 53/14, 28

[56] References Cited
UNITED STATES PATENTS

| 3,095,291 | 6/1963 | Robbins | 206/219 |
| 3,674,134 | 7/1972 | Turner | 206/219 |
| 3,861,522 | 1/1975 | Llewellyn | 229/56 |
| 3,915,297 | 10/1975 | Rausch | 206/219 |

Primary Examiner—William Price
Assistant Examiner—Bruce H. Bernstein
Attorney, Agent, or Firm—Lockwood, Dewey, Zickert & Alex

[57] ABSTRACT

A dual compartment package for containing reactive substances in separate compartments which is suitable for being produced continuously from a single web of film material, and a method for making same. The web of film is formed into a tubular member having a first compartment which assures a generally circular cross section when filled, and a second compartment formed inside the first compartment. The second compartment is attached to the sidewall of the first compartment such that a single sealing formation through three plies of the film material closes both compartments longitudinally. The method provides for a simplified formation of a series of said packages wherein only a single seal forming apparatus is utilized.

15 Claims, 9 Drawing Figures

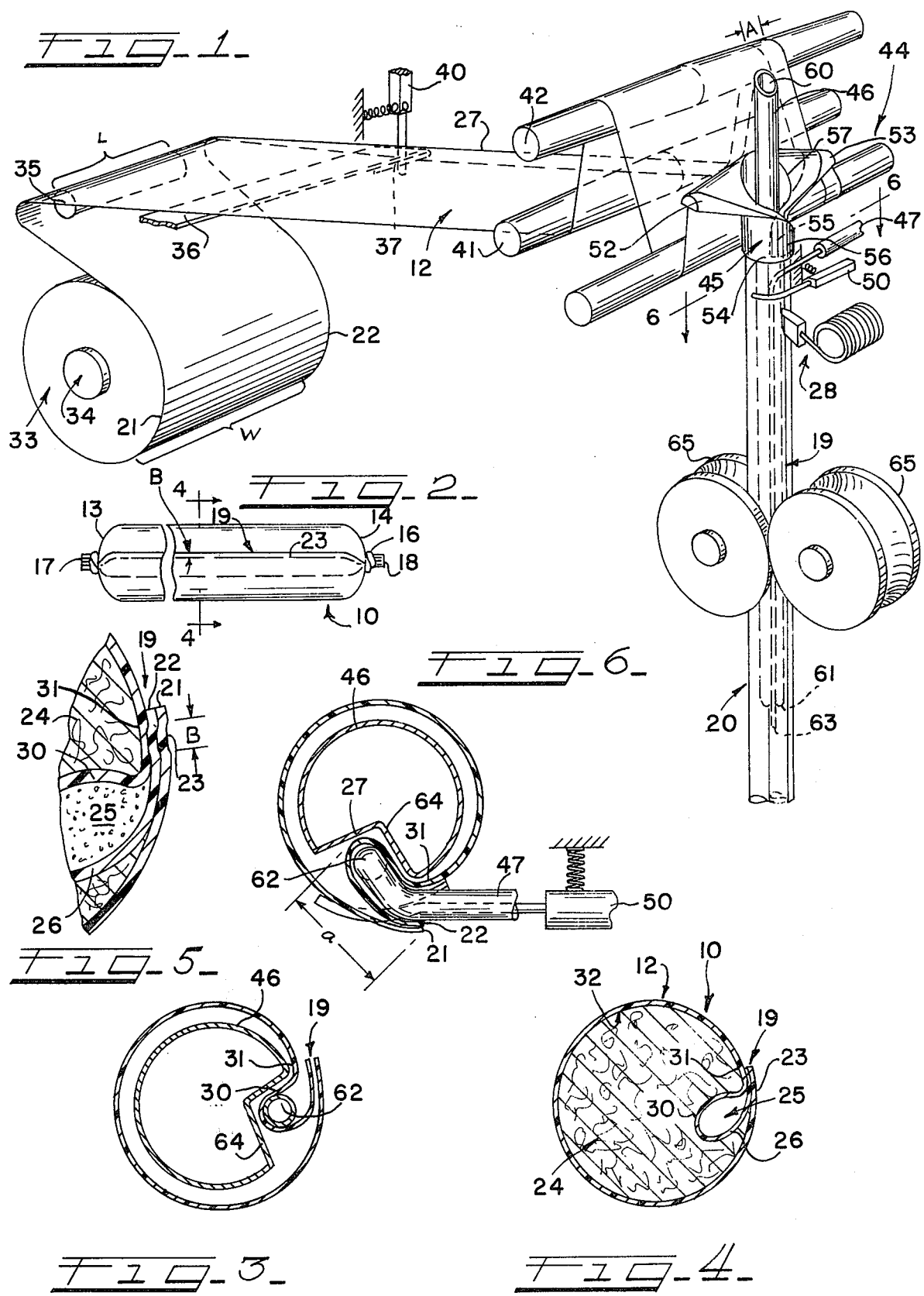

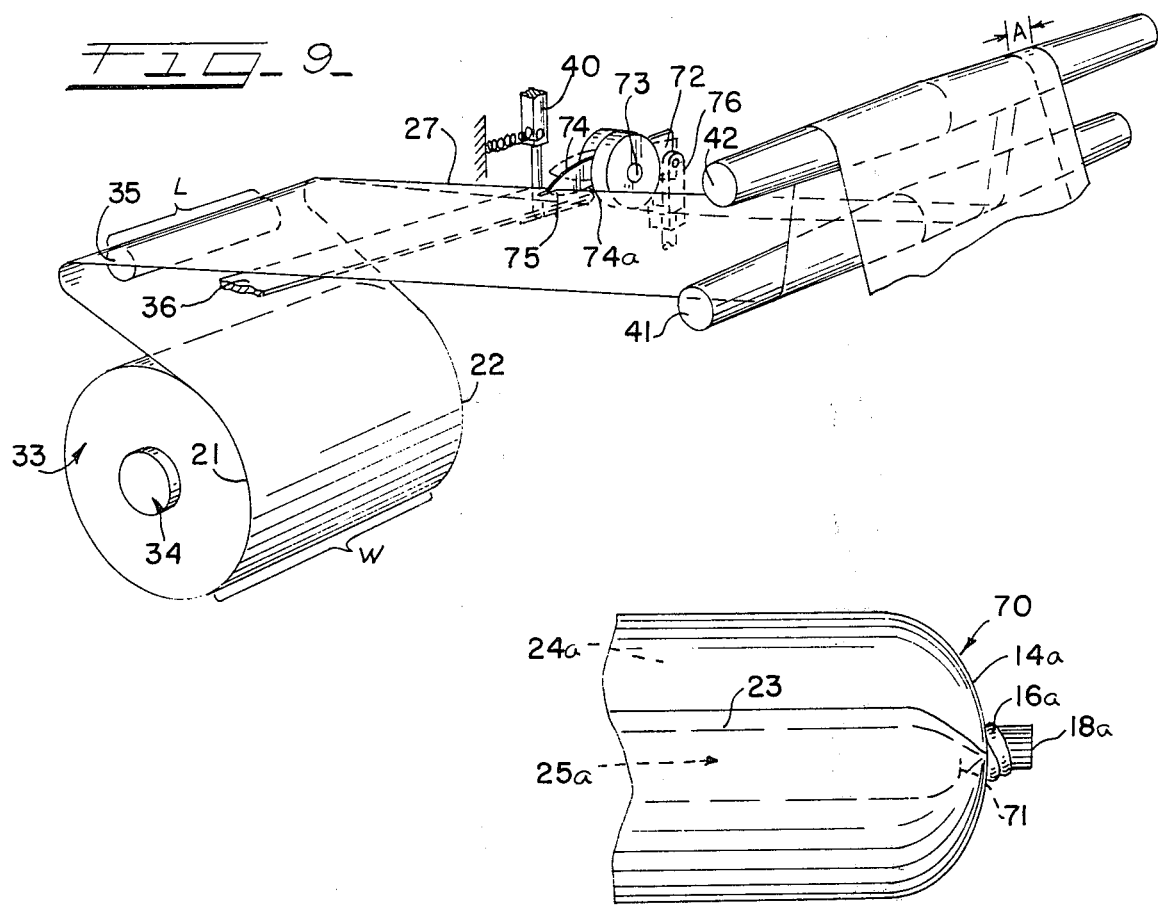
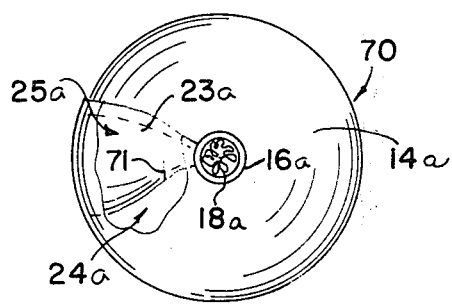

DUAL COMPARTMENT PACKAGE AND METHOD FOR MAKING SAME

This invention relates generally to an improved package wherein materials, especially reactive materials, are stably maintained in separate compartments therein, and to a method for continuously forming the package of the invention.

Certain end-use applications operate on the basis of effecting a physical change through a rapid chemical reaction resulting from the mixture of several reactive substances. For instance, structural elements may be anchored within a surrounding structure by curing of a soft resin composition around the element at ambient temperature to cause the resin to set up hard. In these applications it is expedient to pack the components of the mixture in separate compartments in a unitary package so that those components can be brought together easily and mixed in the required proportions by rupture of the entire package at, or just prior to, the time when the physical change is to be effected. This type of application is especially useful when the surrounding structure prevents ease of access to the location of use. Bringing the components together in this manner prevents the physical change from occurring before the mixture and/or the structural element have been properly positioned in which case the mixture would be incapable of functioning as designed.

In one particular end-use of the above type, the quick-setting property of certain resin systems is utilized to fix anchor bolts in drill holes, such bolts being used, for example, for fastening strengthening members to roofs and walls in mine rock formations. First, one or more packages containing a polymerizable resin formulation are inserted into a drill hole, followed by the bolt or reinforcing rod. The latter compresses the package(s) towards the back of the hole, tears the package(s), and, when rotated, mixes the reactive substances, whereupon the resin cures and hardens.

For resin systems which are quick-setting, e.g., on the order of a few seconds, at room temperature, the need for dual-compartment packages to prevent setting before the bolt is in place has been recognized. In such systems, the polymerizable resin composition generally is located in one compartment, and a catalyst composition in the other, and the package is broken and the compositions are mixed at the time that curing and hardening are desired.

Various dual compartment packages have been described heretofore. However, although these packages are capable of providing the necessary compartmenting of reactive substances the packages suffer from certain serious disadvantages when considered from the viewpoint of the degree of efficiency they offer in use, the degree of versatility of their design, their ability to prevent accidental mixing at an undesired time or position, and their degree of adaptability to a method of rapid package formation and loading, such as, to a continuous mechanized packaging process. Packages intended to be applicable to drill-hole use should be 1) circular so as to conform to drill-hole geometry and thus result in more efficient use of the resin in the drill holes; and 2) rigid so as to reduce the complexity of the drill-hole-loading operation. Rigid cartridges or packages require no special insertion devices or special cartridge modifications to facilitate drill-hole loading as do limp packages.

An important consideration in assessing the merits of a package is its ability to effect a mixing reaction when desired, and to prevent a mixing reaction when not desired, such as if a joined seam in the package inadvertently fails. Also important, is the rate at which such a package can be made and filled. In other words, how amenable is the package design to a rapid, continuous mechanical method for forming and filling it. An additional factor to be weighed in the case of multi-compartmented packages is whether or not the design offers any degree of versatility with respect to varying of the compartment volumes (i.e., the volumes of the components therein) in a package of a given overall size and shape, or whether such volumes are fixed, in which case the processing equipment used needs to be modified to produce a variety of compartment-size combinations with each given overall package size.

Dual compartmented packages are known consisting of an inner compartment sealed within an outer compartment, e.g., an inner flexible envelope within an outer flexible envelope, both envelopes sealed along three or all four edges at the envelope's periphery. As described in U.S. Pat. No. 3,302,410, this type of package is slack, rather than rigid. The forming and filling of other dual compartment packages of this general overall design, e.g., those described in U.S. Reissue Pat. No. 25,869 and U.S. Pat. No. 3,385,427, also entail complicated assembly procedures. Also, dual compartmented packages may include a tubular member and an inner compartmentizing chordal diaphram. However, such packages require a plurality of spaced-apart sealing engagements which complicates the package making machinery. Also, these packages have at least one internal seal. If the inner engagement inadvertently fails before mixing is desired, the reaction takes place and all of the materials in the package are lost for future use. Such packages are described in U.S. Pat. Nos. 3,795,081, 3,861,522, and published application B417,299.

Methods and apparatus are known for continuously producing a series of non-compartmented packages from a continuous tube, e.g., as described in U.S. Pat. Nos. 2,831,302, 3,149,447, and 3,324,621, assigned to Oscar Mayer & Co., and in U.S. Pat. No. 3,380,226 assigned to the assignee of the present application. However, these methods and apparatus produce neither a multi-compartmented tube nor a compartmented package containing different materials in different compartments.

This invention provides a dual compartmented package especially suitable for reactive-component mixtures of fluent materials, which utilizes only a single sealing formation along the length of the package.

The package comprises a first compartment made of pliable-film material and having a substantially circular transverse cross section and a second compartment made of a portion of the pliable-film materials, disposed within the outline of the first compartment. The second compartment is attached to the first compartment along a common sealing engagement therebetween which is substantially parallel to the longitudinal axis of the first compartment from one end thereof to the other. Fluent materials of different compositions are positioned within the package in the first and second compartments. The quantity of the materials in the package are sufficient to produce a substantially circular transverse cross-section therein. The common sealing engagement between the first and second compartments joins three plies of the pliable-film material folded upon one another with two plies being portions adjacent the side edges of the material joined with the edges in aligned adjacent registration. An additional portion of the film material adjacent one of the side edges concavely forms the second compartment with its opposing boundary including the third and innermost ply of the common sealing engagement. The compartments are cooperatively gathered and closed at each end.

Applicant's invention also provides a method for making a dual-compartmented tubular member for a package of the type made from a single layer of pliable film which is formed into a tubular member, filled with differing substances in each compartment, gathered at two positions along its length, sealed at each gathered portion by pairs of closure clips clinched therearound, and severed between closure clips. The method comprises the steps of: folding a portion of the web adjacent one side edge thereof over upon a greater portion of the web forming a pocket or two-ply portion; concavely forming the greater portion with the free edge of the pocket being on the outside thereof; overlapping the opposing side edge of the web over the pocket until the one edge and opposing side edge are in adjacent registration; and sealingly engaging together the one side edge, opposing side edge, and a part of the greater portion of the web forming an inner margin of the pocket which is in inward adjacent registration with the side edges.

It is therefore an object of the invention to provide a dual-compartmented package of the type made from one piece of pliable-film material folded having both compartments formed with a common three-ply sealing formation.

Another object of the invention is to provide a dual compartmented package of the type made from one piece of pliable-film material wherein the barrier between the two compartments will burst first when the package is intentionally crushed, thus providing for proper mixture of the components when desired.

The features of the present invention, which are believed to be novel, are set forth with particularity in the appended claims. The invention, together with the further advantages thereof, may best be understood by reference to the following description taken in connection with the accompanying drawings in the several figures of which like reference numerals identify like elements, and in which:

FIG. 1 is a perspective view of the web-feeding and tube-forming portion of a packaging machine by means of which an embodiment of applicant's method may be performed in forming packages in accordance with applicant's invention;

FIG. 2 is an elevational view of a completed dual compartment package made according to the invention;

FIG. 3 is an enlarged cross-sectional view taken substantially along line 3—3 of FIG. 1;

FIG. 4 is an enlarged cross-sectional view taken substantially along 4—4 of FIG. 2;

FIG. 5 is an enlarged fragmentary detail view of the three-ply sealing formation shown in FIG. 4;

FIG. 6 is a cross-sectional view taken substantially along line 6—6 of FIG. 1;

FIG. 7 is a partial elevational view of a modification in the dual compartment package of the invention showing the position of slits through the inner compartment barrier at the ends of the package;

FIG. 8 is an end view, partially cut away, of the modification of the invention shown in FIG. 7; and FIG. 9 is a perspective view similar to a portion of FIG. 1 which incorporates a slitting means for weakening the inner compartment wall in the package of the invention.

The compartmented package of the invention contains fluent materials, i.e., flowable solids or liquids such as pumpable materials, granular materials, or extrudable paste-like materials, materials of different composition being located in different compartments. Inasmuch as the compartmental feature of the package is utilized to its best advantage with materials which, when united, form mixtures containing reactive components, the material in any compartment preferably is reactive with, or influences the reactivity of, the material in an adjacent compartment. In the compartmented package, the components are storage-stable. When the package is broken and the components are brought together, reaction occurs. The specific compositions present in the compartments can vary widely, depending on the package's intended use. Also, variations in the percentage of each fluid substance relative the total amount of fluid substances in the package can be obtained, although the total volume of the package is fixed by the area of the circular cross section and the length of the package. A package adapted to be inserted into, and subsequently broken in, a drill hole, and its contents mixed and hardened so as to anchor a rock bolt in the drill hole, preferably contains an ambient-temperature-setting, polymerizable resin composition, e.g., a composition which includes an unsaturated polymerizable polyester resin and a monomeric polymerizable ethylenic compound, in one compartment, and in a separate compartment, a composition which catalyzes or initiates the polymerization of the resin composition, e.g., a peroxide. For given combinations of ingredients, the specific quantitative make-up of the resin component and catalyst component can be varied to provide a shelf life, degree of reactivity when mixed, and set strength, according to specific requirements.

To produce the compartmented package by the process of this invention, a continuous dual-compartmented member is made by folding a pocket along one longitudinal edge of a single, continuous web of pliable film material, then forming same into a continuously advancing convoluted tube having single-ply and triple-ply wall portions, and sealing together the triple-ply portion at a single sealing formation disposed longitudinally along the package adjacent the side edges of the package which have been positioned in adjacent registration during the formation of the tube. The compartments of the tube are then continuously filled with differing fluid substances and the filled tube is gathered at portions therealong, clinched at the gathered portions with pairs of metal clips, and severed between the individual clips at each gathered portion to form the package of the invention.

Referring to FIGS. 2, 4, 5, and 6, a dual compartmented package is indicated generally at 10. The package is one of a plurality of such packages continuously formed in part on the apparatus indicated generally at 11 in FIG. 1. This apparatus 11 is the subject matter of a co-pending application, Ser. No. 659,102, filed Feb. 18, 1976 and assigned to the assignee of the instant application.

Dual compartment package 10 is formed of one piece of suitable plastic film material 12. The film material is strong enough to protect the package contents under the conditions the package will encounter in use, but at the same time is sufficiently thin and pliable that it will not interfere with the utility of the package contents, e.g., with the reaction of reactive components therein when the package has been deliberately broken. Any film material which affords the required properties can be employed, e.g., polyethylene, cellophane, vinyl polymers, polymeric linear terephthalate esters such as polyethylene terephthalate, etc. For packaging rock bolt resin systems, biaxially oriented heat set polyethylene terephthalate film is especially preferred because of its strength, inertness with respect to the package contents, and omperviousness to vapors such as those which may issue in the case of styrene-containing systems.

Package 10 has an outer generally circular cross section shape of uniform diameter except at its ends. The diameter of the package is dependent upon the width W of the film material 12 making up the package and the size of the forming structure on the apparatus 11. Each package 10 includes gathered portions 13, 14 at its respective ends. Gathered ends 13, 14 are maintained closed by sealing clips 15, 16, one at each gathered portion which may be applied in pairs in a clinching end overlapping manner by known apparatus as described in U.S. Pat. No. 3,795,083. The segments of gathered portions 13, 14 which project beyond the clinched clips 15, 16 are sheared thereacross at 17, 18 respectively. The uniform diameter portion of package 10 between the gathered portions may be of any desired length within practical limits depending upon the amount of material to be contained in each package. The continuous nature of package formation in apparatus 11 enables changes in package length to be easily facilitated.

The layer or web of plastic used in forming the package has opposing parallel edges 21, 22 which, as the package is formed, are positioned in superposed registry providing a single seam 19 extending the length of each package 10 and defining one side of a single seal formation 23 of uniform width B. Sealing formation 23 and closure clips 15, 16 maintain the entire package 10 in its completed and sealed condition.

As most clearly shown in FIG. 4, package 10 includes two separate compartments; a first compartment, indicated generally at 24, of substantially circular shape; and a second compartment, indicated generally at 25, which is formed entirely within the first compartment 24 and attached to the first compartment at sealing formation 23. The film material or web 12 is first formed into a dual compartment tubular member 20, which is then filled, gathered, clipped, and severed to form package 10. In making the tubular member 20, edge 22 and a portion 26 of the web 12 inwardly adjacent heated rolls or bars which apply sealing pressure as well as heat, or hot air jets. For sealing packages made of oriented polyethylene terephthalate film which film cannot be effectively heat-sealed to itself, the film can be provided with a coating of a heat-sealable film in the zones where the linear juncture is to be made. The heat-seal is preferably made at a slight distance from the edges of the web so as to avoid a possible burnthrough of the film. A distance of about from 1/16 to ¼ inch between the seal and the edge of the web or seam of the package is satisfactory. The width of the juncture is not critical, widths of about 1/16 to ¼ inch usually being satisfactory. Direct sealing as described above is preferred for forming the linear juncture as this assures the greatest control of compartment formation.

After the three-ply single sealing formation 23 closes compartments 24, 25 of the member 20, each compartment may be filled with different materials as desired. The tubular member 20 is then gathered, clipped, and severed to form package 10. The compartmented tube is constricted at desired intervals as described in U.S. Pat. No. 2,831,302 and also closed and severed as described therein. The inter-reactivity of the components of the two compartments of the package is retained upon prolonged storage, e.g., for periods of six months to one year at 95° F., indicative of the strength, inertness, and imperviousness of the polyethylene terephthalate film, the high strength of the heat seal, and the temperature stability of the resin formulation. edge 22 having a width A (FIGS. 1, 2, and 6) is continuously folded under the remainder of the web 12. This first folding step creates a double thickness outer edge 27. The overlying portion 30 of web 12 and underlying portion 26 each form ½ of the circumference of compartment 25. Relative the entire sheet 12, the innermost boundary 31 of portion 30 determines the location of the single seam 19 running the length of package 10. The circumference of second compartment 25 may vary up to approximately 0.7 of the circumference of first compartment 24 wherein the cross section areas become equal. Larger second compartments are impractical.

After edge 22 and the sheet portion 26 are folded under portion 30, the upper side 32 of web 12 is concavely formed until edge 21 substantially overlaps folded edge 27 and is aligned in superposed registration outwardly of edges 22 and boundary 31. This concave formation provides the circular first compartment 24 such that the second compartment 25 is positioned therein. In practicing the invention, only one sealing unit or apparatus is needed to seal the three superposed edge portions together and provide seal formation 23.

The procedure used to seal the tubular members to form the continuous linear juncture therebetween can be any means which can provide a seal or the required strength and tightness with the particular film used. On the basis of convenience and seal strength, a heat seal is preferred, such as that produced by the electronic sealing mechanism described in the aforementioned U.S. Pat. No. 2,831,302, In a typical use for anchoring a rock bolt in a 1-inch-diameter, 5-feet-long vertical drill hole in a mine roof, several of the packages are inserted sequentially into the hole. A rock bolt then is pushed up into the hole, thereby breaking all the packages and contacting the bottom of the hole. After insertion, the bolt is rotated at an average speed of about 100 revolutions per minute so as to mix the resin component and catalyst component. The mixture gels about 40 seconds after mixing. In a standard pull test carried out with loads increased until failure, the resin holds and failure occurs in the bolt in tension.

In FIG. 1, the continuous web 12 of plastic material is drawn from a supply roll 33 of plastic film having the desired width. The supply roll 33 is rotatably positioned on axle 34 which is mounted on the framework (not shown) of apparatus 11. As the web 12 is withdrawn from roll 33 it is passed over and guided by a short roller 35 which is also rotatably mounted to the apparatus framework. The length L of short roller 35 is less than the width W of web 12 and is positioned mediate the ends 21, 22, thereof such that the side edges and specifically edge 22 may be folded under the adjacent portion of web 12. The edge 22, and a portion of web 12 inwardly thereadjacent, is folded under the remainder of web 12, and thence fed through guide 36. The edge 22 and the portion 26 thereadjacent are fed through the slot 37 in the guide. The remainder of web 12 is advanced over the top of the guide. The sensitized finger 40 passes the side edge of guide 36 containing the distal end of slot 37, maintains the edge 22 and folded portion 26 under the remainder of web 12, and forms the temporary crease 27 between portions 26 and 30 thereof.

In order to maintain proper tension across the entire width of web 12 and maintain the folded portion 26 under the remainder of web 12, a pair of crowned rollers 41, 42 are positioned in the path of layer travel. When fed through the apparatus, web 12 passes under roller 41 and over roller 42 in serpentine fashion. Next, the web 12 passes under a cylindrical roller 43 preparatory to entering the tubular member forming portion of apparatus 11, which is indicated generally at 44.

The tubular member forming portion 44 is that portion of apparatus 11 which concavely manipulates or convolutes the top side 32 of web 12 and overlaps edge 21 substantially over temporary edge 27 until it is in adjacent outward registration with edge 22. Tubular member forming portion 44 includes a forming member, generally indicated at 45, large and small mandrels 46, 47 respectively, a guide finger 50, and a single sealing apparatus 51. Forming member 45 includes a pair of shoulders 52, 53 extending outwardly and slightly downwardly from a hollow substantially cylindrical neck structure 54. The neck structure has distal ends 55, 56 respectively which are adjacently juxtaposed to one another in spatial relation.

The juncture of shoulders 52, 53 with neck 54 defines an edge 57 which is substantially oval and has an acutely angled vertical cross section. Edge 57 is curvilinear at its upper portion centrally between shoulders 52 and 53 where the center of web 12 is concavely formed. The edge 57 is discontinuous in juxtaposed spatial relation at its lower portion opposite from the upper portion. At the lower portion of edge 57 layer edge 22 and portion 26 adjacent thereto is concavely bent from shoulder 53 and positioned inwardly of the opposing edge 21 of web 12 which is concavely formed from shoulder 52.

Temporary edge 27 and side edge 21 are brought into an overlapping relation in the space between the juxtaposed ends 55 and 56 of the forming member neck 54. As the sheet first passes over downward sloping shoulders 52, 53 the center of web 12 is pulled into the hollow neck 54 thus inverting the top side layer from a convex shape across shoulders 52, 53 to a concave shape inside neck 54. The inversion advances along the width of web 12 outwardly of its center as the web is pulled into the neck 54. Finally, edge 21 and temporary edge 27 are overlapped until edge 21 is in outward adjacent registration with edge 22. Edge 22 and its adjacent portion 26 of web 12 have thus changed relative position from underneath the web when flat to form the middle layer of a three-ply overlapped portion when the layer is formed into the tubular member 20.

Extending generally through the neck in spatial relation thereto, is a generally cylindrical large mandrel 46. Large mandrel 46 is tubular and has a hollow inside portion 60 through which a substance to be positioned in first compartment 24 of package 10 is fed from the top to the bottom thereof. An indentation 64 is formed in the wall of large mandrel 46 in that portion of the mandrel extending below neck 54. The indentation 64 in this embodiment, approximates a quarter of the cross-sectional size of the large mandrel. The tubular member 20 is formed around the large mandrel 46. The substance inside the mandrel passes into the package first compartment as it leaves the bottom of mandrel 61.

As the tubular member 20 passes outwardly and downward of neck 54, edges 21, 22 are temporarily parted from the inner boundary 31 of layer portion 30 and pass outwardly of a right angle elbow 62 in a small mandrel 47 shown in FIG. 6. The small mandrel 47, like large mandrel 46, is also a tubular member with a hollow inside portion 62 through which a second substance is fed. The small tubular mandrel bends inwardly into the indentation defined by large mandrel wall portion 64. Then, a right angled elbow 62 in the small mandrel 47 positions the remainder of the mandrel in parallel adjacent relationship to large mandrel 46 inside the indented portion thereof. The second substance is positioned in the second compartment 25 as it leaves the bottom 63 of small mandrel 47. It can be appreciated that the sizes on the large and small mandrels may be changed readily for providing packages of differing cross-section dimensions.

Edges 22, 21 are brought back into a contiguous relationship with boundary 31 below the horizontal portion of small mandrel 47 by the action of a horizontal guide finger 50. The guide finger is curved at its distal end to approximate the outer curvature of tubular member 20 and realigns the edges and boundary prior to being sealed together by sealing apparatus 50. Different types of sealers may be utilized for forming the sealing formation 23 between the three plies of web 12. For example, a thin hot air blast of about 900° F. may be directed onto portions of web 12 adjacent edges 21, 22 and boundary 31 which will cause the three layers to join together.

After the tubular member 20 is sealed at 23, it is passed through driving rolls 65—65 which provide power to draw web 12 from reel 33 through the package forming apparatus 11. Below the driving rolls 65—65 beyond the bottoms 61, 63 of the large and small mandrels respectively the tubular member 20 is filled as described with one substance in the first compartment 24 and a second substance in the second compartment 25.

Inside the large mandrel 46 is a fluent paste-like solid consisting of a polyester resin (an inhibited reactive mixture of a resin prepared by reacting a maleic anhyride and a saturated polycarboxylic acid with one or more glycols, and 35 percent styrene, based on the resin), a major amount of an inert filler, a promoter, a thixotropic thickening agent. The materials are fed into both compartments of the heat-sealed convoluted tube at a uniform rate such that the weight ratio of material in compartment 24 to that in compartment 25 (FIG. 4) is about 12 to 1 (about 9 to 1 by volume). The tubular member is then gathered at various positions along its length, a pair of clips are clinched around each gathered portion as described in U.S. Pat. No. 3,795,083 or in an equivalent manner, and the tubular member is severed between each of the clips making up the pair, thus forming one end of two dual compartment packages 10 of the invention.

A modification of the dual compartment package of the invention is shown in FIGS. 7 and 8, and is generally indicated at 70. Modified package 70 is identical to the structure of package 10, with the addition of a minute slit 71 (shown for one side of package 70 only) positioned in the portion of the layer 12 forming the second compartment 25a of the package. Portions of modified package 70 identical to portions of package 10 in FIG. 2 are denoted by the same numeral with the letter a added thereto. Slit 71 is positioned in the gathered portion (shown at 14a) at one or both ends of the package as desired, inwardly adjacent of clinching clip 16a. Each slit 71 is sufficiently small that material from second compartment 25a will not readily travel therethrough to mix with material in compartment in 24a, or vice versa, during normal formation and handling of the package 70. However, each slit 71 is of a size sufficient to weaken the burst strength of the sidewall of second compartment of 25a such that when the package 70 is intentionally crushed and broken open, the second compartment 25a will break open first at the slit 71. Initial rupture of the portion of web 12 forming the second compartment 25a is desirable to aid mixing of the reactive components, when such mixing is desired. It should be noted that the size, position and number of slits 71 may be varied in each package 70 depending upon the desired burst strength of the second compartment wall.

A preferred method for forming slits 71 in the packages of the invention is shown most clearly in FIG. 9. A cutting means, in this embodiment a dual edge knife 72 is pivotally mounted at 73 to the package making machinery frame (not shown) such that the knife edges 74–74a at the distal end of the cutting means 72 pass through apertures 75 in the distal end of folding guide 36. Knife edges 74–74a move up and down through apertures 75 as the film material 12 passes through the guide. Each slit 71 is then cut across the temporary folded edge 27. The pivot point 73 of the cutting means is selectively adjustable for moving the cutting edges inwardly and outwardly of the apertures 75 to vary the size of slits 71. A prime mover, such as a pneumatic or hydraulic cylinder (not shown), may be pivotally connected to the cutting means 72 at mounting 76. The prime mover may be timed to operate in any sequence. In the modification shown, each slit 71 is cut in material 12 such that it is positioned inwardly adjacent the clinching clips 16a as they are applied around the gathered portion 14a of the package 70. If preferred, the slits 71 may be made at any interval along the length of the second compartment 25a.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:
1. A dual compartmented package comprising
a first compartment made of pliable-film material;
a second compartment made of a portion of said pliable-film material, disposed within said first compartment, and attached thereto along a common sealing engagement therebetween which is substantially parallel to the longitudinal axis of said first compartment from one end thereof to the other;
fluent materials of different composition within said package in said first and second compartments therein, the common sealing engagement between said first and second compartments joining three plies of said pliable film material folded upon one another with two plies being portions adjacent the opposed parallel side edges of said material joined with said edges in aligned adjacent registration, and an additional portion of said film material adjacent one of said side edges forming said second compartment with its opposing boundary including the third and innermost ply of said common sealing engagement; said compartments being cooperatively gathered and closed at each end.

2. A package according to claim 1 wherein the fluent material in one of said compartments is reactive with, or influences the reactivity of, that in an adjacent compartment.

3. A package according to claim 1 wherein said pliable-film material is inert with respect to said fluent solid materials and impervious to vapors issuable therefrom, and said compartments have substantially the same rupture strength.

4. A package according to claim 1 wherein said pliable-film material is inert with respect to said fluent solid materials and impervious to vapors issuable therefrom, and said second compartment has a rupture strength which is less than said first compartment.

5. A package according to claim 4 wherein
said film material making up said second compartment includes
an imperforate portion mediate said closed ends, and perforate means positioned inwardly adjacent one of said closed ends where gathered for decreasing the rupture strength of said second compartment, said perforate means being of insufficient size to permit the flow of substances from one of said compartments to the other of said compartments under normal package pressures.

6. A package according to claim 1 wherein the quantity of said materials in said package being sufficient to produce a substantially circular transverse cross section therein.

7. A package according to claim 3 wherein said film material is thermoplastic and said linear junctures are sealed.

8. A package according to claim 7 wherein said film material comprises a polymeric linear terephthalate ester, and said linear junctures are sealed.

9. A dual compartmented package adapted to be inserted into and subsequently broken in, a drill hole and its contents mixed and subsequently hardened so as to anchor a rock bolt in the drill hole, said package comprising
a first compartment made of pliable-film material and having a substantially circular transverse cross section;
a second compartment made of a portion of said pliable-film material, disposed within the outline of said first compartment and attached to the first compartment along a common sealing engagement therebetween which is substantially parallel to the longitudinal axis of said first compartment from one end thereof to the other;

fluent materials within said package in said compartments therein, the fluent material in one compartment including an ambient-temperature-setting, polymerizable resin composition and that in the other a composition which catalyzes the polymerization of said resin composition, said film material being inert with respect to said fluent materials and impervious to vapors issuable therefrom the quantity of said material in said compartments being sufficient to produce a substantially circular cross section therein, the common sealing engagement between said first and second compartments joining three plies of said pliable-film material folded upon one another with two plies being portions adjacent the opposed parallel side edges of said material joined such that said edges are in aligned adjacent registration, and an additional portion of said film material adjacent one of said side edges concavely forming said second compartment with its opposing boundary being the third and innermost ply of said common sealing engagement, said compartments being cooperatively gathered and closed at each end.

10. A package according to claim 9 wherein said film material comprises a polymeric linear terphthalate ester and said common sealing engagement is a heat seal.

11. A package according to claim 10 wherein the fluent material in one compartment includes an unsaturated polymerizable polyester resin, a monomeric polymerizable ethylenic compound, a gelation inhibiter, a gelation promoter, an inert filler, and a thickening agent, and the fluent material in the other compartment includes a peroxide catalyst, an inert filler, and a thickening agent.

12. A package according to claim 9 wherein said pliable-film material is inert with respect to said fluent solid materials and impervious to vapors issuable therefrom, and said compartments have substantially the same rupture strength.

13. A package according to claim 9 wherein said pliable-film material is inert with respect to said fluent solid materials and impervious to vapors issuable therefrom, and said second compartment has a rupture strength which is less than said first compartment.

14. A package according to claim 13 wherein
said film material making up said second compartment includes
an imperforate portion mediate said closed ends, and perforate means positioned inwardly adjacent one of said closed ends where gathered for decreasing the rupture strength of said second compartment,
said perforate means being of insufficient size to permit the flow of substances from one of said compartments to the other of said compartments under normal package pressures.

15. A method for making a dual compartmented tubular member for a package of the type made from a single web of pliable film which is formed into said tubular member, filled with differing substances in each compartment, gathered at two positions along its length, sealed at each said gathered portion by pairs of closure clips clinched therearound; and severed between closure clips in each pair thereof, said method comprising the steps of:
folding a portion of said web adjacent one side edge thereof over upon a greater portion of said web forming a pocket or two-ply portion;
concavely forming said greater portion with the free edge of said pocket being on the outside thereof and overlapping the opposing side edge of said web over said pocket until said one side edge and said opposing side edge are in adjacent registration; and
sealingly engaging together said one side edge, said opposing side edge, and a part of said greater portion of said web forming an inner margin of said pocket which is in inward adjacent registration with said side edges.

* * * * *

UNITED STATES PATENT AND TRADEMARK OFFICE
CERTIFICATE OF CORRECTION

PATENT NO. : 4,009,778
DATED : March 1, 1977
INVENTOR(S) : Duane Aaron Howell

It is certified that error appears in the above-identified patent and that said Letters Patent are hereby corrected as shown below:

The portion of Column 6 from Line 19, beginning with the word "edge" and continuing on Column 6 to Line 50 and ending with "U.S. Pat. No. 2,831,302" is out of place and should be inserted in Column 5 at Line 58, after "cent" and before the word "heated".

Signed and Sealed this fifth Day of July 1977

[SEAL]

Attest:

RUTH C. MASON
*Attesting Officer*

C. MARSHALL DANN
*Commissioner of Patents and Trademarks*